United States Patent [19]
Yoshinaka et al.

[11] Patent Number: 5,944,885
[45] Date of Patent: Aug. 31, 1999

[54] PAVING MIXTURE EXCELLENT IN MIXING PROPERTY AND COMPACTING PROPERTY

[75] Inventors: Tamotsu Yoshinaka, Chiba; Nobuyuki Nemoto, Kawaguchi, both of Japan

[73] Assignee: Nippon Hodo Co., Ltd., Tokyo, Japan

[21] Appl. No.: 09/082,361

[22] Filed: May 20, 1998

[51] Int. Cl.[6] .................................................. C09D 195/00
[52] U.S. Cl. ................ 106/281.1; 106/283; 106/284.01; 106/284.3; 106/284.4
[58] Field of Search ................ 106/281.1, 283, 106/284.01, 284.3, 284.4

[56] References Cited

U.S. PATENT DOCUMENTS

| | | | |
|---|---|---|---|
| 4,235,640 | 11/1980 | Cox et al. | 106/97 |
| 4,515,839 | 5/1985 | Broaddus et al. | 428/17 |
| 4,714,629 | 12/1987 | Davis et al. | 427/138 |
| 5,223,031 | 6/1993 | Sugi et al. | 106/277 |
| 5,597,409 | 1/1997 | Ito et al. | 106/671 |

*Primary Examiner*—David Brunsman
*Attorney, Agent, or Firm*—Scully, Scott, Murphy & Presser

[57] ABSTRACT

A paving mixture excellent in mixing property and compacting property, which relaxes temperature condition conventionally required for a paving mixture, and can maintain certain quality and durability even if blending ratio condition conventionally required for an aggregate is relaxed, is provided. A paving mixture wherein a constituent binder is so prepared that a minute bubble particle is produced and kept in the binder when the mixture is mixed with heating or compacted.

13 Claims, 2 Drawing Sheets

PAVING MIXTURE EXCELLENT IN MIXING PROPERTY AND COMPACTING PROPERTY

BACKGROUND OF THE INVENTION

1. Field of the Invention

The present invention relates to a paving mixture which is easily produced and has excellent applying property, and a pavement construction method using that, and particularly, to a paving mixture in which temperature condition conventionally required is relaxed and further, blending ratio condition for a recycled aggregate is relaxed, and a pavement construction method using the same.

2. Prior Art

Technologies regarding recycle in pavement field have been conventionally widely investigated for utilization, including methods using generated materials in pavement and by-products from other fields, and some of them are already standardized by outlines. Those technologies include one paving mixture shown in "Outline for Plant Recycle Pavement Technology" in Japan, and the proportion of the recycled mixtures for paving based on the total production of paving mixtures has increased year by year. While usual paving mixtures are produced recently in approximately the same amount, the amount produced of the recycled mixtures has for paving has been increasing year by year reaching to about 30% in 1995. Namely, social requirement for the recycle mixture for pavement is more and more increasing.

As one method for producing such mixture, there is an indirect heating method in which mixing is conducted with heat-exchanging between a recycled aggregate having normal temperature and a new aggregate heated to high temperature. In the indirect heating method, a batch-wise plant is usually used. According to outline thereof, the blending ratio of the recycled aggregate is usually restricted to about 20% or lower in view of limitation in heating temperature of the new aggregate, necessity of maintenance of temperature of the paving mixture at certain level, heat resistance of a drier, and the like. The indirect heating method has problems in the aspects of quality and applying property that sufficient heat exchange is not easily effected and temperature of the mixture tends to lower, applying property at construction site deteriorates following to decrease in temperature, a binder newly added and an original binder included in the recycled aggregate are not surely mixed in easy fashion, and the like. Further, it is difficult to make blending ratio of the recycled aggregate more than 20% with maintaining given temperature of the mixture from the view point of ability of the plant for heating the aggregate. As other production method, there is a method in which mixing property is enhanced by previously heating the recycled aggregate. In this case, however, there are problems that the original binder to be coated on the recycled aggregate is easily degraded by heat and consequently blue smoke tends to be produced in mixing for production, combustion cost is high in comparison with the indirect heating method since the recycled aggregate and new aggregate are heated and consequently atmospheric disadvantage occurs such as generation of a carbon dioxide gas discharged in combustion, and the like.

OBJECTS OF THE INVENTION

The conventional paving mixture has problems that quality and finishing of pavement is badly influenced due to degradation tendency of workability, applying property and the like with rake, scoop and the like and of uniform paving property by an asphalt finisher, and that blue smoke is easily produced in mixing for production, since temperature of the mixture easily decreases as compared with that of a general mixture for paving. Therefore, improvement for relaxation and reduction of temperature condition of the paving mixture has been desired. Further, since there are a lot of plants for a paving mixture all over the country, if problems with respect to increase in blending ratio of a recycled aggregate, for example, relaxation of temperature condition, mixing property of new and original binders, or maintenance of certain quality of the paving mixture when the temperature of the mixture decreases, can be technically improved, it is supposed that such a technique will contribute to social requirement that utilization of a recycled aggregate which is a recycled resource should be promoted.

Therefore, the object of the present invention is to provide a paving mixture excellent in mixing property and compacting property, which relaxes temperature condition conventionally required for a paving mixture, and can maintain certain quality and durability even if blending ratio condition conventionally required for an aggregate is relaxed, and a method for constructing pavement.

SUMMARY OF THE INVENTION

The paving mixture of the present invention is characterized in that a constituent binder is so prepared that a minute bubble particle is produced and kept in the binder when the mixture is mixed with heating or compacted.

When a minute bubble particle is produced and kept in the binder according to the present invention, excellent mixing property and easy compacting property are imparted to the mixture, and it becomes possible to relax and expand the range of temperature condition toward lower temperature side and further to relax blending ratio condition of a recycled aggregate.

More specifically, when a minute bubble particle is produced and kept in producing a paving mixture, it becomes possible to obtain mixing property more excellent than that of a conventional paving mixture by improving ability of the binder for coating an aggregate and mixing property of new and original binders and consequently to obtain certain quality more uniform and stable than that of a conventional paving mixture.

Further, in applying, compacting mechanism which should be referred to as bearing effect by a minute bubble particle can be imparted to a paving mixture, and therefore, compacting property can be obtained more easily than a conventional paving mixture. This characteristic compacting mechanism is to keep a minute bubble particle produced in a binder, and by reducing apparent viscosity of the binder, (1) sliding property can be imparted to an aggregate particle coated smaller than a coarse aggregate or a fine aggregate, (2) flow ability can be imparted to the binder, (3) flowing and filling property into clearance portion of the aggregate can be imparted to a binder mortar composed of the binder with stone powder or sand, or with stone powder and sand, therefore, aggregates coated with the binder easily slide each other under outer force for compacting like bearing and the aggregates are densely compacted as pavement. Further, applying properties such as uniform paving property by an asphalt finisher, workability with a rake, scoop and the like, are improved more effectively than the conventional paving mixture.

BRIEF DESCRIPTION OF DRAWINGS

In FIG. 1, number 1 represents an aggregate particle, number 2 represents a binder or binder mortar, number 3 represents clearance portion of an aggregate directly after uniform paving, number 4 represents clearance portion of an aggregate directly after application of compacting outer force, number 5 represents a compacting roller, number 6 represents a minute bubble particle, and number 7 represents a binder or binder mortar having apparent viscosity reduced due to a minute bubble particle.

PREFERRED EMBODIMENTS OF THE INVENTION

Figure 1A:
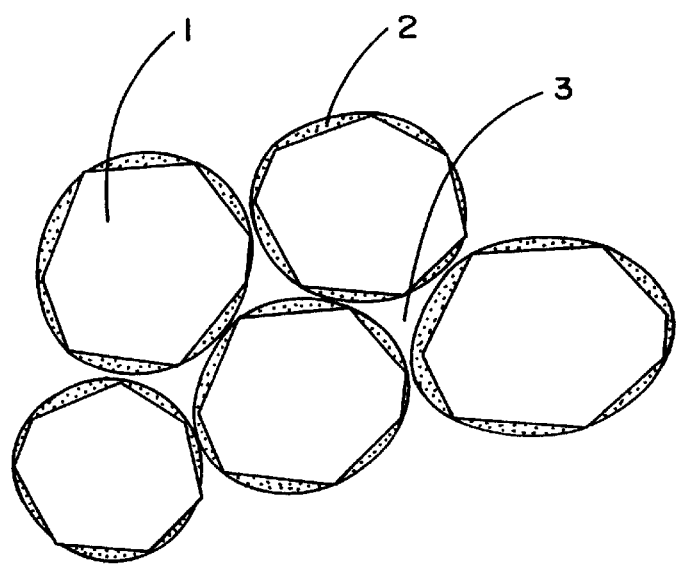
FIG. 1 is an illustrative view representing compacting mechanism of paving mixture of the present invention. In this figure, (a) represents a cross-sectional view of pavement before application of compacting outer force after paving with the paving mixture, and (b) represents a cross-sectional view of pavement obtained by applying compacting outer force to the paving mixture of the present invention.
Figure 1B:
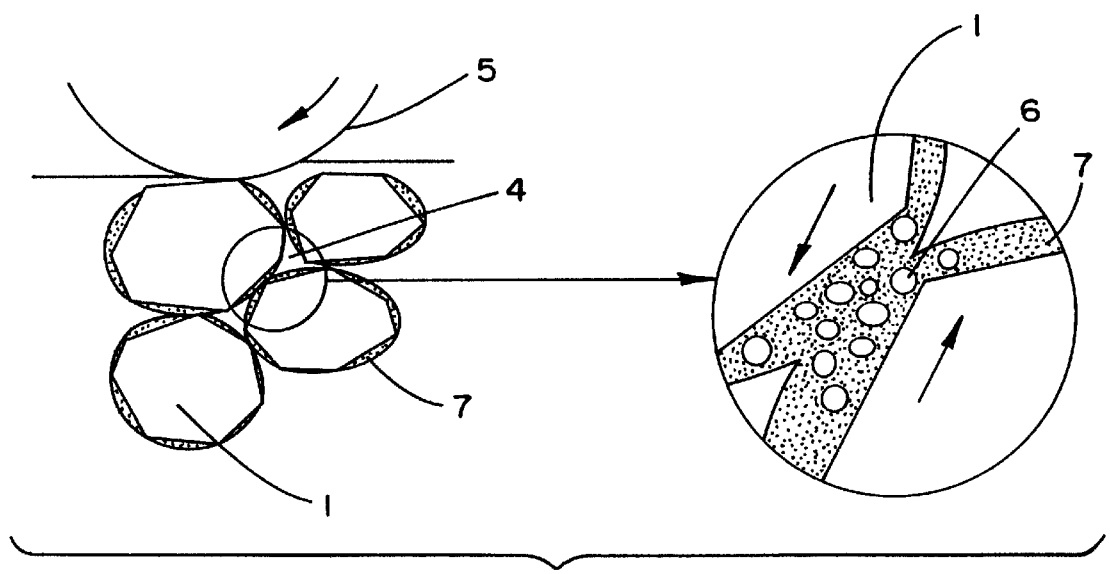

Concept of the compacting mechanism is shown in FIG. 1(a),(b). FIG. 1(a) represents a cross-sectional view of pavement before application of compacting outer force after paving with the paving mixture of the present invention, and FIG. 1(b) represents a cross-sectional view of pavement obtained by applying compacting outer force to the mixture. An aggregate particle 1 constituting a paving mixture is coated with a binder mortar 2 containing a minute bubble particle or binder mortar containing a minute bubble particle. In FIG. 1(a), since only paving has been effected and compacting outer force has not been applied and sliding of the aggregate particle coated and flow filling with the binder or binder mortar have not conducted yet, clearance portion 3 of the aggregate is large, and the pavement is not complete. In FIG. 1(b), there is formed condition in which the aggregate particle easily slides by reduction of apparent viscosity of the binder due to existence of a minute bubble particle 6 in the coating binder of the aggregate, the aggregates easily move and interlock each other by application of compacting outer force by a compact rolling machine, and further, clearance portion 4 of the aggregate is contracted by flow filling with the binder or binder mortar, to form densely compacted pavement.

The present invention utilizes a minute bubble particle produced in the binder in all processes frommixing to compacting, and particularly, it has feature that a minute bubble particle is positively utilized also for improvement of compacting. As a result, the paving mixture can be easily mixed and compacted, and producing property and applying property are not degraded, therefore, pavement having ensured quality can be constructed.

Mixtures which are subjects of the present invention include mixtures of any kind and blend such as asphalt-based mixtures, polymer-based mixtures and the like provided they are obtained by mixing of an aggregate with a binder. Examples thereof include a dense grading asphalt mixture, open grading asphalt mixture, crushed rock mastic mixture, rolled asphalt mixture and the like. Blending of these pavement materials, for example, blending of the asphalt-based mixture is designed according to object and use thereof by Marshall test.

It is desirable that the bubble particle utilized is produced and kept in large number, in as small size as possible, and for long period of time. For producing a bubble particle in the binder, any method may be basically used provided it can produce a minute bubble particle in the binder under heating and mixing condition wherein the binder is soften and melted, such as a method in which a foaming agent which is decomposed and generates a gas under given temperature is added, a method in which a substance containing crystalline water is added, a method in which a water absorptive substance which has already absorbed water is added, a method in which a gas or liquid is mechanically blew in, and the like. For example, there can be used a bubble generating method for preparing beverage containing carbon dioxide, and the like. Examples of the substances containing a foaming agent or crystalline water include gypsum dihydrate or gypsum semihydrate, ammonium sulfate, ammonium hydrate, cobalt chloride hydrate, cobalt acetate hydrate, chromium sulfate hydrate, copper sulfate hydrate, iron chloride hydrate, iron sulfate hydrate, magnesium carbonate hydrate, manganese chloride hydrate, manganese acetate hydrate, sodium sulfite hydrate, sodium phosphate, sodium tungstate hydrate, nickel sulfate hydrate, zeolite and the like. As the water absorptive substance, various substances including a highly water absorptive substance and the like are listed, and an aggregate particle constituting a recycled mixture for painting is also included. In particular, there is desirably used a substance which does not produce a minute bubble particle until heating condition under which a binder is softened or melted is attained and produces a minute bubble particle under the heating condition, and as selection standard, a substance which produces a minute bubble particle at a temperature of 90° C. or more is adopted.

Among them, substances having crystalline water such as gypsum dihydrate and gypsum semihydrate are most preferable. The crystalline water-containing substance is preferably used together with a surfactant and preferably a small amount of free water. More preferably, the crystalline water-containing substance in fine powder is mixed with a surfactant in the presence of a small amount of water to produce a paste or viscous mixture. The amount of free water is preferably sufficient to produce a paste or viscous mixture and usually 10–100%, more preferably 20–60%, by weight of the crystalline water-containing substance and surfactant. The amount of the crystalline water-containing substance is preferably 1–30% by weight of the binder and the amount of the surfactant is preferably 0.1–3% by weight of the binder.

The size of the bubble particle is preferably as minute as possible, however, it is not limited providing the effect of the present invention is manifested. Usually, the average particle size is about 3 mm or less. Further, it is required that a part of the bubble particle exists in a binder. The number of which is no limited providing bearing effect is manifested, and for example, the bubble particle is produced in a number of one or more, preferably 10 or more per an aggregate.

It is desired that the bubble particle is produced and kept in a large number and in a minute form for a long period of time, and for stable production of the bubble particle against the lapse of time and for long time keeping in a binder, it is effective to reinforce bubble film of the bubble particle. For example, there are listed various methods such as a method in which stability of bubble film of the minute bubble particle is enhanced by using a surfactant as a coupling agent for a binder with the minute bubble particle, a method in which gelatin or the like is coated on the bubble particle, and the like, and it is advantageous to combine them. In particular, if gypsum dihydrate and a surfactant are previously kneaded in the presence of a small amount of water and the resulted paste-like mixture is added to a binder heated to around usual mixing temperature, increased amount of the minute bubble particle, formation of the minute bubble particle, foaming for a long period of time, and maintenance of the minute bubble particle in a binder for a long period of time are effectively realized, as compared with the case in which only gypsum dihydrate is added to a binder.

The minute bubble particle has effect that when it is produced in a paving mixture, producing property and applying property thereof are improved, and when the bubble particle is combined with a bubble reinforcing agent, further improvement effect is obtained. When gypsum dihydrate and a surfactant are previously mixed and then the resulted mixture is added to a binder to prepare a paving mixture, as one example, stickiness of a mixture observed in a conventional paving mixture decreased, mixing property of a new binder with an original binder contained in a recycled aggregate increased as shown in the following example in detail, and further, sure kneading, namely compacting effect more excellent than prior art is obtained in compacting with a compact rolling machine such as a roller and the like. This is effective for improving applying property and workability against temperature decrease, improving quality and durability of pavement, improving finishing as a commercial product, and the like. Further, as the surfactant, when a cationic surfactant which is used also as a release preventing agent is used, adhesion of a binder with an aggregate increases more than that of a conventional mixture for paving, and durability as pavement is improved.

In this way, the method in which a surfactant is used as a bubble reinforcing agent in producing a minute bubble particle a in a binder can realize stabilization of the minute bubble particle for a long period of time and simultaneously can improve producing property, applying property and durability of a paving mixture.

A production equipment for obtaining the paving mixture of the present invention is not particularly restricted and may be an indirect heating method, previous heating method and the like.

The paving mixture of the present invention can provide excellent abilities such as temperature sensitive property (relaxation of temperature condition and handling property), coating property on an aggregate and mixing property of new and original binders (in production and durability), compacting property (applying property and quality of pavement) and the like, by existence of a minute bubble particle in a constituent binder from production to application. As described above, since producing property and applying property are improved as compared with those of a conventional paving mixture, it is possible to relax production conditions for a conventional paving mixture such as conventional temperature condition and orientation ratio condition of an aggregate, and further, to relax conventional application conditions such as weather condition like temperature and construction site condition, in addition to maintenance of quality and durability.

The paving mixture of the present invention can suppress discharge of a carbon dioxide gas due to heating of materials such as an aggregate and binder, suppress generation of blue smoke due to reheating of a recycled aggregate, and decrease fuel consumption for production, since the mixture can relax and lower temperature conditions such as production temperature and application temperature. Further, since blending ratio of a recycled aggregate can be relaxed, promotion of utilization of a recycled aggregate which is a recycled resource becomes possible. Namely, it can be judged that the present invention is very effective for environmental problems such as earth warming and limited resource problems of petroleum fuel and stone materials.

The following example illustrates the present invention.

The example shows production of the paving mixture of the present invention, and it shows that the paving mixture of the present invention is effective for relaxation of conventional temperature condition, and further, for relaxation of conventional blending ratio condition of a recycled aggregate.

EXAMPLE

The method for producing the paving mixture of the present invention is basically the same with a conventional paving mixture, and to which is added a procedure for producing a minute bubble particle in a binder. The example includes a production example according to an indirect heating method by a compact pagmill mixer and an experiment example regarding quality thereof, when gypsum dihydrate and a surfactant are used for producing a minute bubble particle in a binder. In the example, as the surfactant, there was used a cationic surfactant.

In the example, samples for Marshall test in which production temperature condition and blending ratio of a recycled aggregate are changed are produced, aromatic components are analyzed by an iatro-scanning analyzer for measuring compacting degree and catching mixing condition of new and original asphalt, and it is confirmed that the paving mixture of the present invention can relax the temperature condition more effectively as compared with a conventional paving mixture and that the equivalent quality is obtained even if blending ratio of a conventional aggregate is relaxed and increased.

Blending of an aggregate is recycled dense grading asphalt mixture (13 mm Top), and production conditions of Marshal samples are shown in Table 1 and blending conditions are shown in Table 2.

First, as pre-operation, gypsum and a surfactant are previously kneaded. As the kneading order, there are considered various orders such as a method in which cool water or hot water is added and dissolved in a surfactant and gypsum dihydrate is added to the mixture, a method in which gypsum dihydrate is added to a surfactant in aqueous liquid form, a method in which a surfactant is added to gypsum dihydrate in aqueous wet form, and the like. It is desirable that gypsum and a surfactant are surely kneaded, and a stirrer is desirably used.

For producing an asphalt mixture, a new asphalt and a new aggregate are first heated. The heating temperature of the new asphalt is 160° C., and the heating temperature of the new aggregate was shown in Table 1. Then, a recycled aggregate having normal temperature is added to the heated new aggregate and they are mixed, and further, the kneaded material of gypsum and the surfactant in aqueous paste form is added to the resulted mixture and they are mixed. The kneaded material of gypsum and the surfactant is used in an amount 6% in terms of ratio by weight based on the amount of the asphalt, and the mixing time is about 5 second. Finally, the new asphalt is sprayed and wet mixing is conducted, and when the whole aggregate is coated fully with the new asphalt, the production is completed. The mixing time is about 35 second.

As described above, the material in which gypsum and the surfactant are previously kneaded is used, there is formed good condition that the surfactant advantageously exists on the film surface of the produced minute bubble particle, and the minute bubble particle in the asphalt is finely produced in large amount and kept for a long period of time. By the production method as described above, gypsum and the surfactant are uniformly dispersed in the aggregate, and the minute bubble particle is produced in the asphalt in every portion of the paving mixture.

Figure 2:
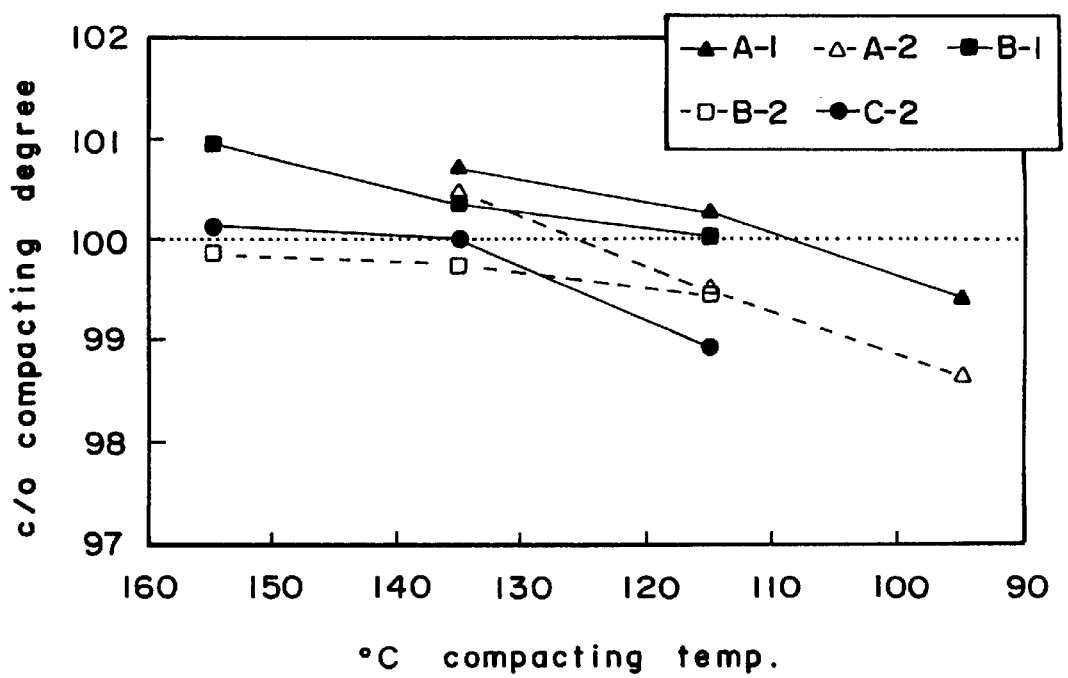
FIG. 2 is a graph representing results of compacting degrees of the paving mixture of the present invention and a conventional paving mixture.
Figure 3:
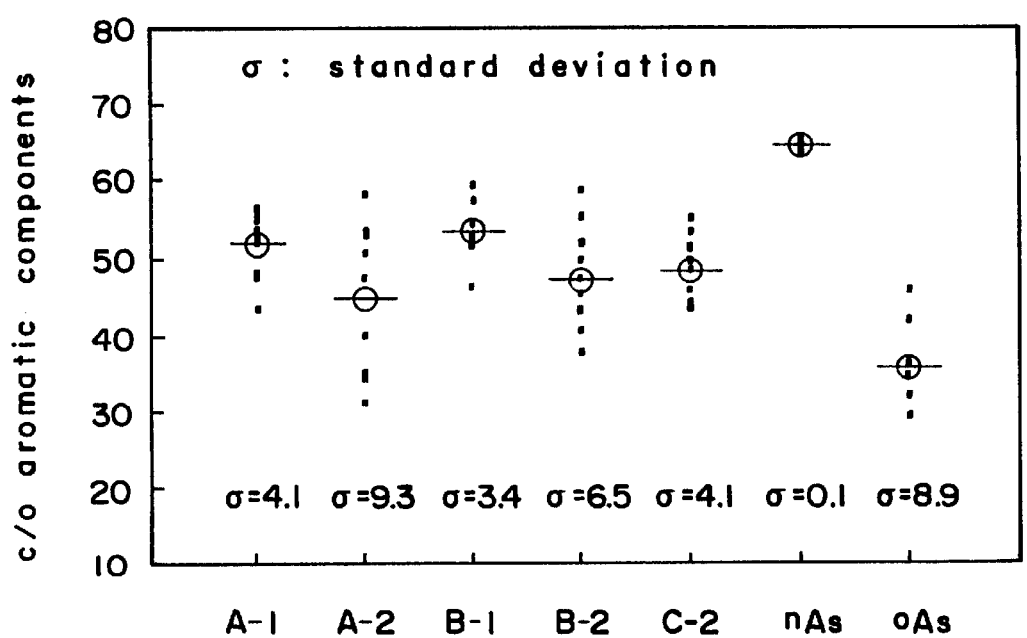
FIG. 3 is a graph representing analysis results of aromatic components obtained by iatro-scanning of the paving mixture of the present invention and a conventional paving mixture.

For preparing the Marshall sample, the produced asphalt mixture was compacted for 75 times on each side by Auto Runma compacting machine. For analyzing aromatic components by an iatro-scanning analyzer, a small amount of asphalt is took from each mixed asphalt mixture of each blending, and aromatic components of the asphalt composition is remarked using the iatro-scanning analyzer. The reason for this is that it is generally said that when asphalt is degraded, the composition varies, and aromatic components change to resin components and the resin components change to asphaltene components, and it is supposed that mixing condition of new and original asphalt can be evaluated by observing the ratio of aromatic components in asphalt and dispersion thereof. The results of compacting degree of Marshal samples using the asphalt mixture of the present invention and the conventional asphalt mixture are shown in FIG. 2, and the results of the analysis of aromatic components by an iatro-scanning analyzer are shown in FIG. 3. The evaluation standard of compacting degree is density of the conventional asphalt mixture (C-2) according to the conventional aggregate blending ratio at a compacting temperature of 135° C.

In FIG. 2, A-1 represents the recycled asphalt mixture of the present invention in which the recycled aggregate blending ratio is increased to 40%, B-1 represents the asphalt mixture of the present invention in which the recycled aggregate blending ratio is increased to 30%, A-2 represents the conventional asphalt mixture in which the aggregate blending ratio is increased to 40%, B-2 represents the conventional asphalt mixture in which the recycled aggregate blending ratio is increased to 30%, C-2 represents the conventional asphalt mixture according to the conventional recycled aggregate blending ratio.

In FIG. 2, the Marshal sample of the conventional asphalt mixture reveals tendency that when the compacting temperature condition is simply reduced, compacting becomes impossible. On the other hand, the Marshal sample of the asphalt mixture of the present invention reveals high compacting degree when the temperature condition is lowered in the like manner, and A-1 (recycled aggregate blending ratio: 40%) and B-1 (recycled aggregate blending ratio: 30%) of the present invention manifest the equivalent values as compared with that of C-2 (recycled aggregate blending ratio: 20%) as a standard, even if the compacting temperature lowers by about 20 to 30° C. From these results, it can be said that the asphalt mixture of the present invention is effective for securing compacting property and condition with relaxing the temperature condition, and use of the paving mixture of the present invention is effective for securing compacting degree against decrease in the mixing temperature in the case of increase in a recycled aggregate at normal temperature.

According to FIG. 3, the ratio of aromatic components (average value) is about 65% in the new asphalt and about 35% in the original asphalt in the recycled aggregate, and the components took from the asphalt mixture exist between them. Variation in aromatic components tends to be larger in the conventional asphalt mixture (A-2 and B-2) in which recycled aggregate blending ratio is increased than in mixtures of the other blending. On the other hand, the variation width in the asphalt mixture of the present invention (A-1 and B-1) in which recycled aggregate blending ratio is increased is approximately the same as that of the conventional recycled asphalt mixture (C-2) of the conventional recycled aggregate blending ratio, and consequently it is clearly shown that the minute bubble particle of the asphalt mixture of the present invention contributes to mixing property of new asphalt (n As) and original asphalt (oAs).

TABLE 1

Preparation conditions of Marshal Test sample

| Item | Mixture of the present invention | | Conventional mixture | | |
| --- | --- | --- | --- | --- | --- |
| | A-1 | B-1 | A-2 | B-2 | C-2 |
| Recycled aggregate blending ratio | 40% | 30% | 40% | 30% | 20% |
| New aggregate heating temperature | | | 220° C. | | |
| Recycled aggregate temperature | | | 20° C. | | |

TABLE 2

Blending example of recycled dense grading asphalt mixture (13 mm Top)

| | Item | | | |
| --- | --- | --- | --- | --- |
| | New aggregate blending ratio (%) | | | Recycled |
| Blending ratio (%) | Crushed stone, Sand | Stone powder | New binder blending ratio (%) | aggregate blending ratio (%) |
| A | 53.8 | 2.8 | 3.3 | 40 |
| B | 62.9 | 3.3 | 3.8 | 30 |
| C | 71.7 | 3.8 | 4.4 | 20 |

What is claimed is:

1. A paving mixture wherein a constituent binder is so prepared that a minute bubble particle is produced and kept in the binder when the mixture is mixed with heating or compacted.

2. The paving mixture according to claim 1, wherein a minute bubble particle producing component is contained in the binder.

3. The paving mixture according to claim 2, wherein the minute bubble particle producing component is a substance which produces a minute bubble particle at a temperature more than 90° C.

4. The paving mixture according to claim 2, wherein the minute bubble particle producing component is contained in such an amount that more than one minute bubble particles are produced per one aggregate.

5. The paving mixture according to claim 2, wherein the minute bubble particle producing component is a substance containing crystalline water in combination with a surfactant and free water.

6. The paving mixture according to claim 5, wherein the surfactant is a cationic surfactant.

7. The paving mixture according to claim 5, wherein the amount of the substance containing crystalline water is 1–30% in terms of ratio by weight to the amount of the binder.

8. The paving mixture according to claim 5, wherein the amount added of the surfactant is 0.1–3% in terms of ratio by weight to the amount of the binder.

9. The paving mixture according to claim 2, wherein the minute bubble particle producing component comprises a member selected from the group consisting of gypsum dihydrate, gypsum semihydrate, ammonium sulfate, ammonium hydrate, cobalt chloride hydrate, cobalt acetate hydrate, chromium sulfate hydrate, copper sulfate hydrate, iron chloride hydrate, iron sulfate hydrate, magnesium carbonate hydrate, manganese chloride hydrate, manganese acetate hydrate, sodium sulfite hydrate, sodium phosphate, sodium tungstate hydrate, nickel sulfate hydrate, water-containing inorganic porous minute particle and water absorptive organic substance which has already absorbed water.

10. The paving mixture according to claim 9, wherein the minute bubble particle producing component is a combination of gypsum dihydrate or gypsum semihydrate, a surfactant and a small amount of free water.

11. The paving mixture according to claim 1, wherein the binder is an asphalt-based binder.

12. The paving mixture according to claim 1, wherein a bubble reinforcing agent is contained in the binder.

13. A pavement construction method wherein when a paving mixture containing an aggregate and a binder as a essential component is mixed with heating to soften and melt the binder, a minute bubble particle is produced in the binder, and then, pavement and compacting are conducted with maintaining the produced minute bubble particle.

* * * * *

UNITED STATES PATENT AND TRADEMARK OFFICE
CERTIFICATE OF CORRECTION

PATENT NO. : 5,944,885
DATED : August 31, 1999
INVENTOR(S) : Tomatsu Yoshinaka

Page 1 of 1

It is certified that error appears in the above-identified patent and that said Letters Patent is hereby corrected as shown below:

Title page,
After Section [22], insert the following:

-- [30] Foreign Application Priority Data

May 20, 1997 [JP] Japan..............9-129469 --

Column 3,
Line 49, "frommixing" should read -- from mixing --.

Signed and Sealed this

Twelfth Day of February, 2002

*Attest:*

JAMES E. ROGAN
*Attesting Officer*   Director of the United States Patent and Trademark Office

UNITED STATES PATENT AND TRADEMARK OFFICE
CERTIFICATE OF CORRECTION

PATENT NO. : 5,944,885
DATED : August 31, 1999
INVENTOR(S) : Tomatsu Yoshinaka and Nobuyuk Nemoto It is certified that error appears in the above-identified patent and that said Letters Patent is hereby corrected as shown below:

<u>Title page,</u>
After Item [22], insert the following:

-- [30]  Foreign Application Priority Data

May 20, 1997 [JP] Japan ................. 9-129469 --

<u>Column 3,</u>
Line 49, "frommixing" should read -- from mixing --.

This certificate supersedes Certificate of Correction issued February 12, 2002

Signed and Sealed this

Twenty-fifth Day of June, 2002

*Attest:*

*Attesting Officer*

JAMES E. ROGAN
*Director of the United States Patent and Trademark Office*